(12) United States Patent
Priebe

(10) Patent No.: US 10,232,692 B1
(45) Date of Patent: Mar. 19, 2019

(54) AUTOMOBILE WIND DIRECTING ACCESSORY DEVICE

(71) Applicant: Walter Priebe, Fort Lauderdale, FL (US)

(72) Inventor: Walter Priebe, Fort Lauderdale, FL (US)

(*) Notice: Subject to any disclaimer, the term of this patent is extended or adjusted under 35 U.S.C. 154(b) by 0 days.

(21) Appl. No.: 15/438,664

(22) Filed: Feb. 21, 2017

Related U.S. Application Data

(60) Provisional application No. 62/297,821, filed on Feb. 20, 2016.

(51) Int. Cl.
B60J 7/22 (2006.01)
B60J 1/20 (2006.01)

(52) U.S. Cl.
CPC ............. B60J 7/22 (2013.01); B60J 1/2002 (2013.01)

(58) Field of Classification Search
CPC ... B60J 7/22; B60J 7/223; B60J 1/2002; B60J 1/20; B60H 1/265
USPC .......... 296/217, 78.1, 152, 180.1, 180.5, 85; 40/591–593; 454/95–97, 128–131
See application file for complete search history.

(56) References Cited

U.S. PATENT DOCUMENTS

| | | | |
|---|---|---|---|
| D160,049 S * | 9/1950 | Zagel | 454/128 |
| 2,573,396 A * | 10/1951 | Bryce | B60J 1/20 454/128 |
| 2,582,914 A * | 1/1952 | Reed | B60J 1/20 296/152 |
| 4,393,754 A * | 7/1983 | Hough | B60J 7/22 296/217 |
| 5,033,528 A * | 7/1991 | Volcani | A45B 17/00 160/351 |
| 5,769,526 A * | 6/1998 | Shaffer | B60Q 1/24 362/396 |
| 6,076,879 A * | 6/2000 | Bills | B60R 13/01 296/39.1 |
| 9,117,381 B1 * | 8/2015 | Shaw, IV | G09F 7/18 |

* cited by examiner

Primary Examiner — Dennis H Pedder
(74) Attorney, Agent, or Firm — David P. Lhota, Esq.; Lhota & Associates, P.A.

(57) ABSTRACT

An automobile wind directing accessory device that is attachable to a sunroof opening of an automobile and has a panel or windshield, support bracket secured to a rear surface of the windshield, a support arm rotatably connected to the support bracket and at least one adjustable clamp having a first leg slidably connected to the support arm to enable the clamp to be adjusted inward or outward inside the sunroof opening to dictate the point where the windshield directs wind flow into the cabin of a vehicle and a second leg pivotally connected to the first leg by a spring device that maintains tips of the first leg and second leg in engagement with a vehicle in a normally closed position to secure the wind directing device in a vehicle opening and that are separated and opened when the first leg and second leg of the clamp are squeezed toward each other. The automobile wind directing accessory device is adapted for attached to a vehicle inside a window wherein the clamped is affixed to the support bracket in alignment with the rear surface of the wind shield.

17 Claims, 17 Drawing Sheets

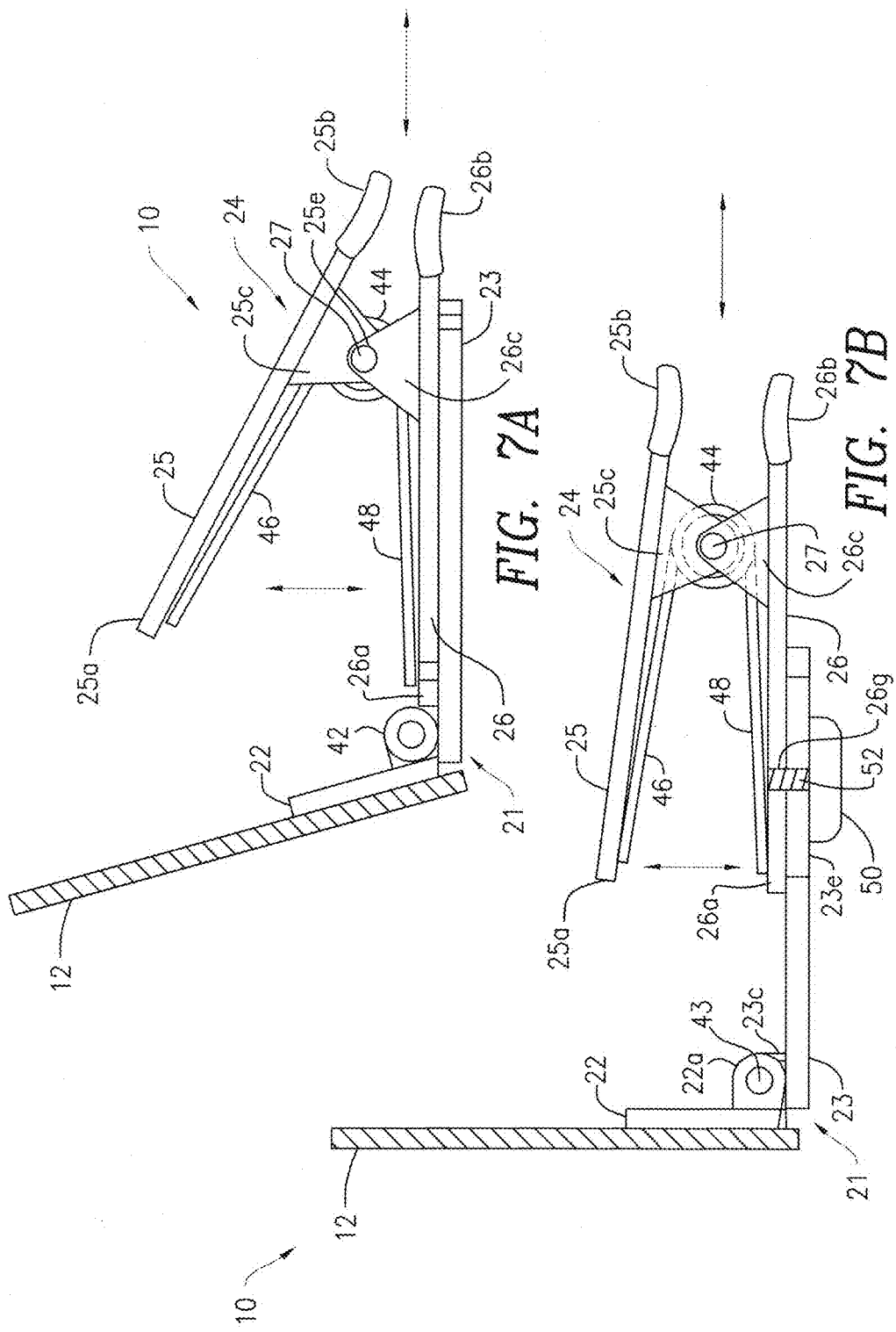

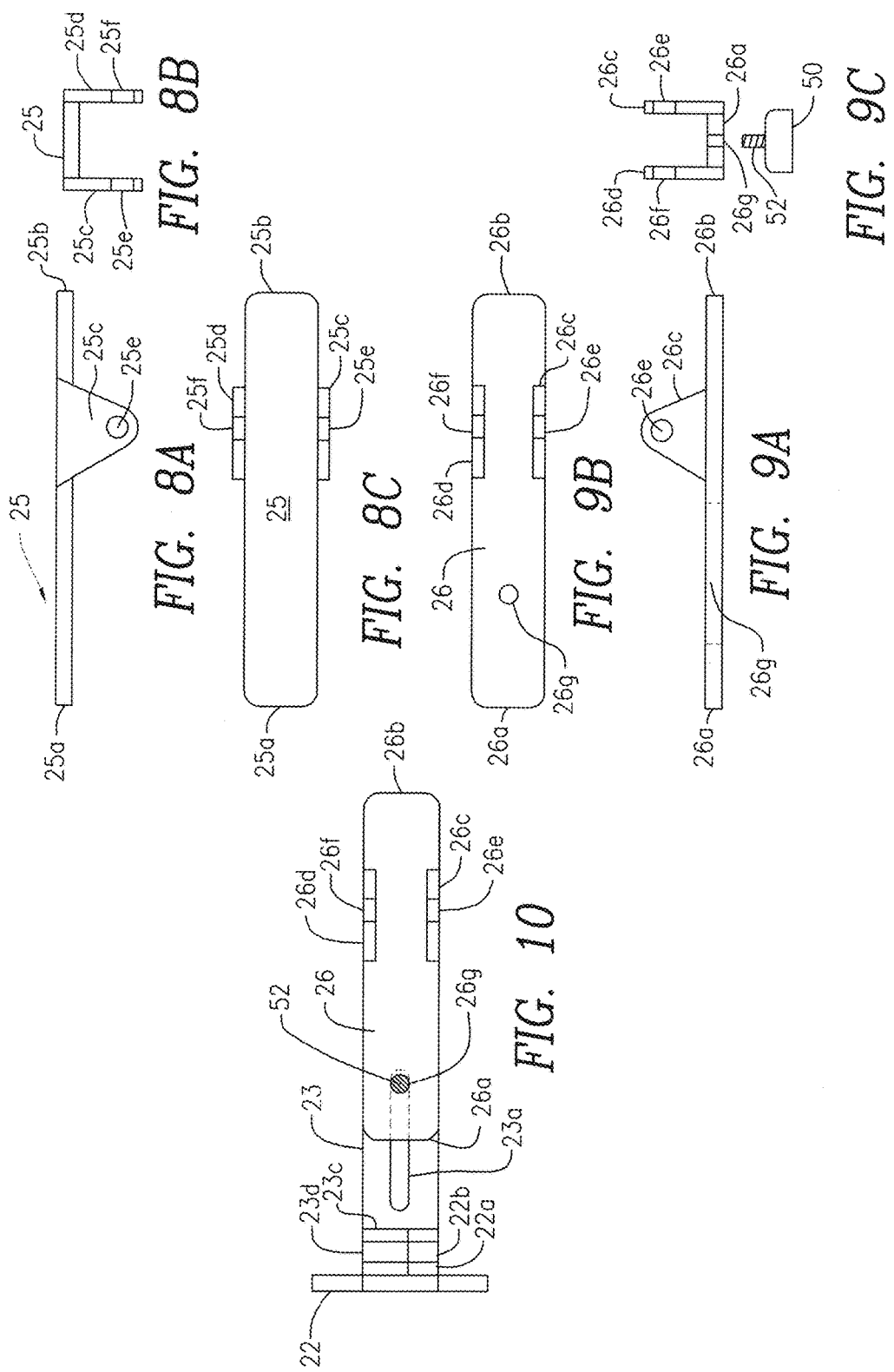

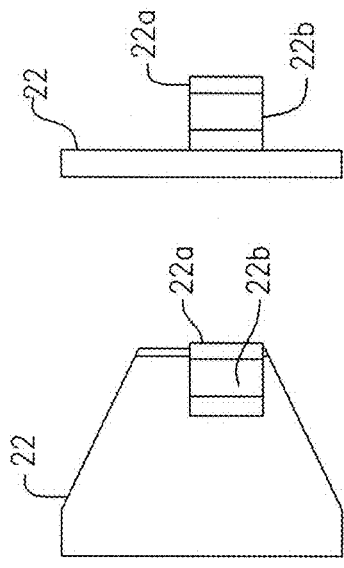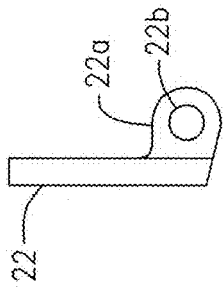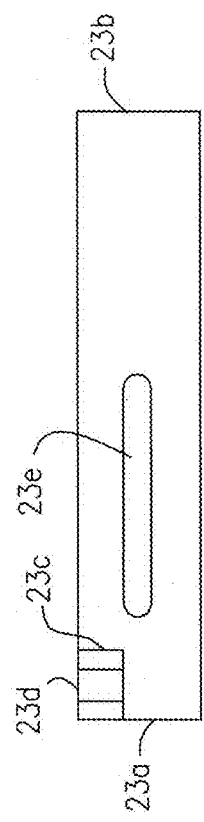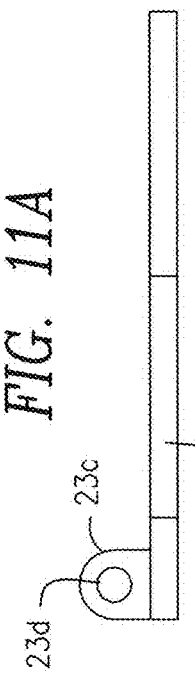
FIG. 12A
FIG. 12B
FIG. 12C
FIG. 11A
FIG. 11B

AUTOMOBILE WIND DIRECTING ACCESSORY DEVICE

CROSS-REFERENCE TO RELATED APPLICATION

This application claims the benefit of provisional Ser. No. 62/297,821 filed Feb. 20, 2016.

STATEMENT REGARDING FEDERALLY SPONSORED RESEARCH OR DEVELOPMENT

N/A

FIELD OF THE INVENTION

This invention relates generally to an automobile wind directing device, and more particularly, to an automobile accessory device that attaches to an opening in a vehicle, such as a sunroof, and catches and directs wind into the cabin of the vehicle.

BACKGROUND OF THE INVENTION

Many people enjoy the feel of wind rushing over their face while in a moving automobile. People sitting in the back seat of a car with an open window or in a convertible are in the best position for experiencing the exhilaration of wind in their face. Automobiles with sunroofs are also popular, however, they do not facilitate wind blowing on or rushing onto occupants in the cabin of a vehicle. Rather, the wind merely blows over the roof and sunroof of the car with very little of that wind making it into the vehicle cabin. In fact, the driver and passenger in the front seat of an automobile with a sunroof feel virtually no wind from the sunroof. This is in part because many sunroofs are designed with a deflector at the front end of the sunroof for directing wind over the sunroof rather than into the cabin. Accordingly, while enjoying the openness of a sunroof, many are left desiring the effects of wind rushing onto them through the sunroof but with no practical solution for achieving this exhilaration. To experience gushing wind, one can place their hand out the sunroof but they can only do this temporarily because their arm tires, they become nervous about sustaining an injury or they must concentrate on driving. They can also hold a flat object out of the sunroof, but this solution rarely works effectively and creates a risk of dropping the object or causing injury. Accordingly, they are left wanting.

If there existed a device that could safely direct ambient wind through a sunroof or other vehicle opening into the cabin of the vehicle onto the driver or passengers, it would address these desires and be well received. However, there are no devices known that can redirect wind into the cabin of an automobile safely, effectively and efficiently. Therefore, there exists a need for an automobile accessory that can be safely and securely positioned in or near a sunroof for catching and directing wind into the cabin of an automobile while driving. It is, therefore, to the effective resolution of the aforementioned problems and shortcomings of the prior art that the present invention is directed. The instant invention addresses this unfulfilled need in the prior art by providing a wind deflecting or directing automobile accessory that directs wind into the cabin of an automobile while driving as contemplated by the instant invention disclosed herein.

SUMMARY OF THE INVENTION

In light of the foregoing, it is an object of the present invention to provide an automobile wind directing accessory device that is attachable to a sunroof opening of an automobile and has a panel or windshield, support bracket secured to a rear surface of the windshield and at least one adjustable clamp wherein the clamp may be adjusted inward or outward inside the sunroof opening to dictate the point of wind flow into the cabin of a vehicle. The support bracket may have a rotatable support arm that is connected to the clamp at one end and pivots on the support bracket at another end and may be fixed at a select angle to dictate the angle of wind deflection into the vehicle cabin.

It is another object of the instant invention, to provide an automobile wind directing accessory device that is attachable to a sunroof opening of an automobile and has a panel or windshield, support bracket secured to a rear surface of the windshield, a support arm rotatably connected to the support bracket and at least one adjustable clamp having a first leg slidably connected to the support arm to enable the clamp to be adjusted inward or outward inside the sunroof opening to dictate the point where the windshield directs wind flow into the cabin of a vehicle and a second leg pivotally connected to the first leg by a spring device that maintains tips of the first leg and second leg in engagement with a vehicle in a normally closed position to secure the wind directing device in a vehicle opening and that are separated and opened when the first leg and second leg of the clamp are squeezed toward each other.

It is also an object of the instant invention to provide an automobile wind directing accessory device that is attachable to an opening of an automobile cabin and has a panel or windshield, support bracket secured to a rear surface of the windshield and a clamp having a first leg connected to the support bracket and a second leg pivotally connected to the first leg by a spring device that maintains tips of the first leg and second leg in engagement with a vehicle in a normally closed position to secure the wind directing device in a vehicle opening and that are separated and opened when the first leg and second leg of the clamp are squeezed toward each other.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7A is a side elevational view of the automobile wind directing device and clamping system showing the windshield at a first angle in accordance with the instant invention;

FIG. 7B is a side elevational view of the automobile wind directing device and clamping system showing the windshield at a right angle in accordance with the instant invention;

FIG. 8A is a side elevational view of the upper jaw of the clamp of the wind directing device in accordance with the preferred embodiment of the instant invention;

FIG. 8B is a top elevational view of the upper jaw of the clamp of the wind directing device in accordance with the preferred embodiment of the instant invention;

FIG. 8C is a front end elevational view of the upper jaw of the clamp of the wind directing device in accordance with the preferred embodiment of the instant invention;

FIG. 9A is a side elevational view of the lower jaw of the clamp of the wind directing device in accordance with the preferred embodiment of the instant invention;

FIG. 9B is a top elevational view of the lower jaw of the clamp of the wind directing device in accordance with the preferred embodiment of the instant invention;

FIG. 9C is a front end elevational view of the lower jaw of the clamp and set screw of the wind directing device in accordance with the preferred embodiment of the instant invention;

FIG. 10 is a top elevational view of the lower jaw of the clamp mounted on the lower flange of the support bracket for the wind directing device in accordance with the preferred embodiment of the instant invention FIG. 11A is a top elevational view of the lower flange of the support bracket of the wind directing device in accordance with the preferred embodiment of the instant invention;

FIG. 11B is a side elevational view of the lower flange of the support bracket of the wind directing device in accordance with the preferred embodiment of the instant invention;

FIG. 12A is a front elevational view of the upper flange of the support bracket of the wind directing device in accordance with the preferred embodiment of the instant invention;

FIG. 12B is a top elevational view of the upper flange of the support bracket of the wind directing device in accordance with the preferred embodiment of the instant invention;

FIG. 12C is a side elevational view of the upper flange of the support bracket of the wind directing device in accordance with the preferred embodiment of the instant invention;

DETAILED DESCRIPTION OF THE INVENTION

With reference to the drawings in which like reference designators refer to like elements, FIGS. 1 to 21 depict the preferred and alternative embodiments of the instant invention which is generally referenced as an automobile wind directing device, wind directing device and, or by numeric character 10. In light of the foregoing, the automobile wind directing device 10 is a removable automobile accessory that attaches to an automobile roof in the opening of a sunroof to catch and direct wind into the cabin of the automobile onto the driver and, or passenger while driving. The wind directing device 10 is may be adjusted inward or outward within the opening or angularly and may vary in size to dictate the amount and width of wind caught and directed into the cabin and whether it will be directed to just the driver, passenger or everyone in the automobile.

Figure 1:
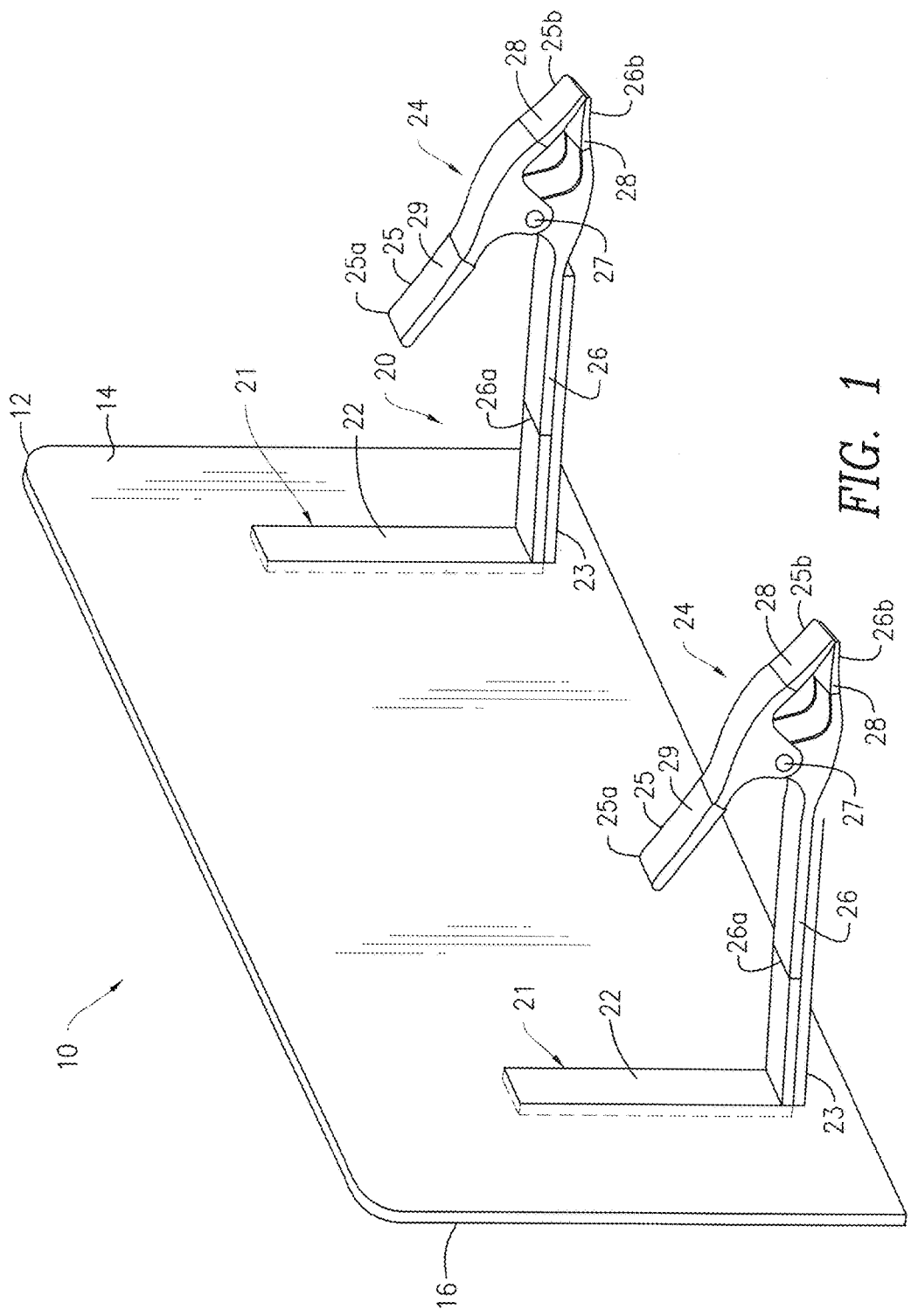
FIG. 1 is a perspective view of the automobile wind directing device having two clamps in accordance with the instant invention.
Figure 2:
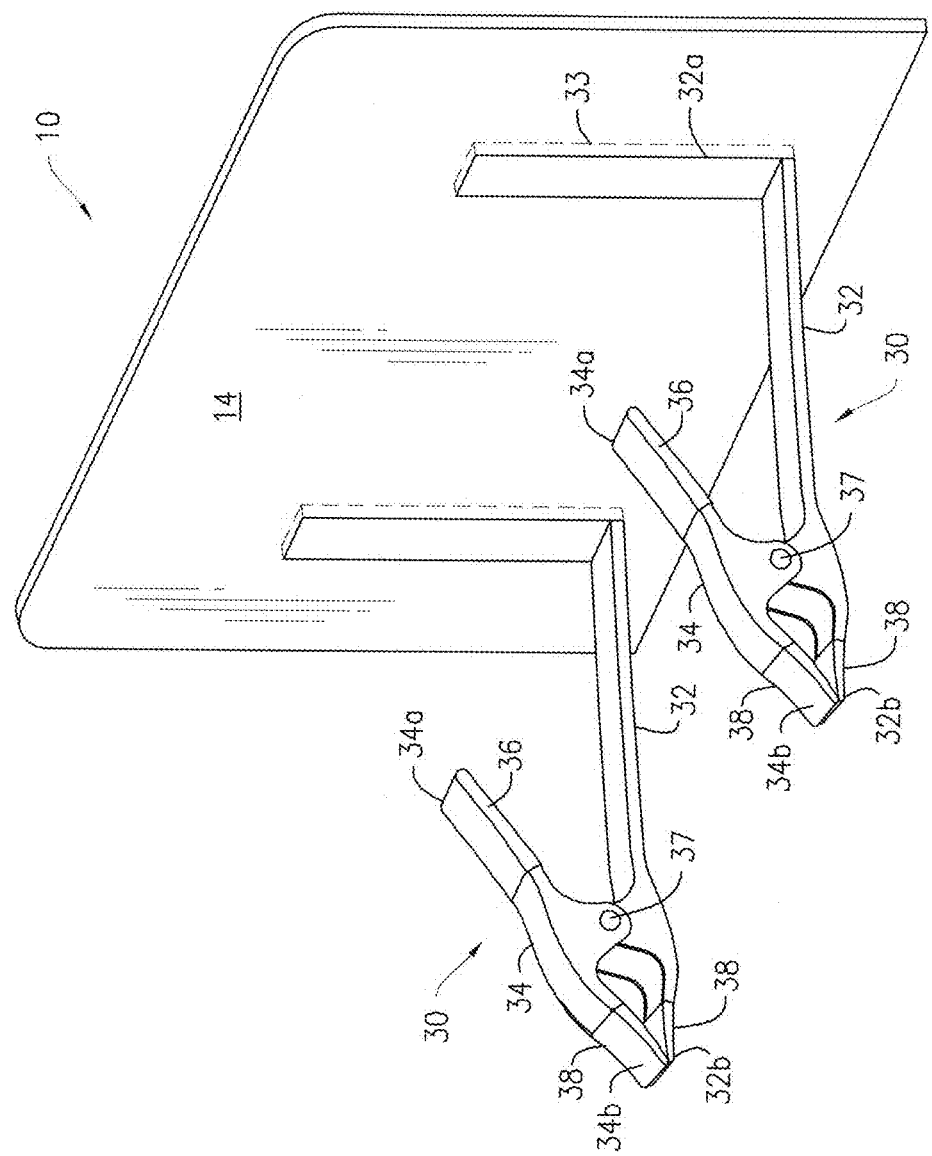
FIG. 2 is a perspective view of the automobile wind directing device having two clamps in accordance with a first alternative embodiment of the instant invention.
Figure 3:
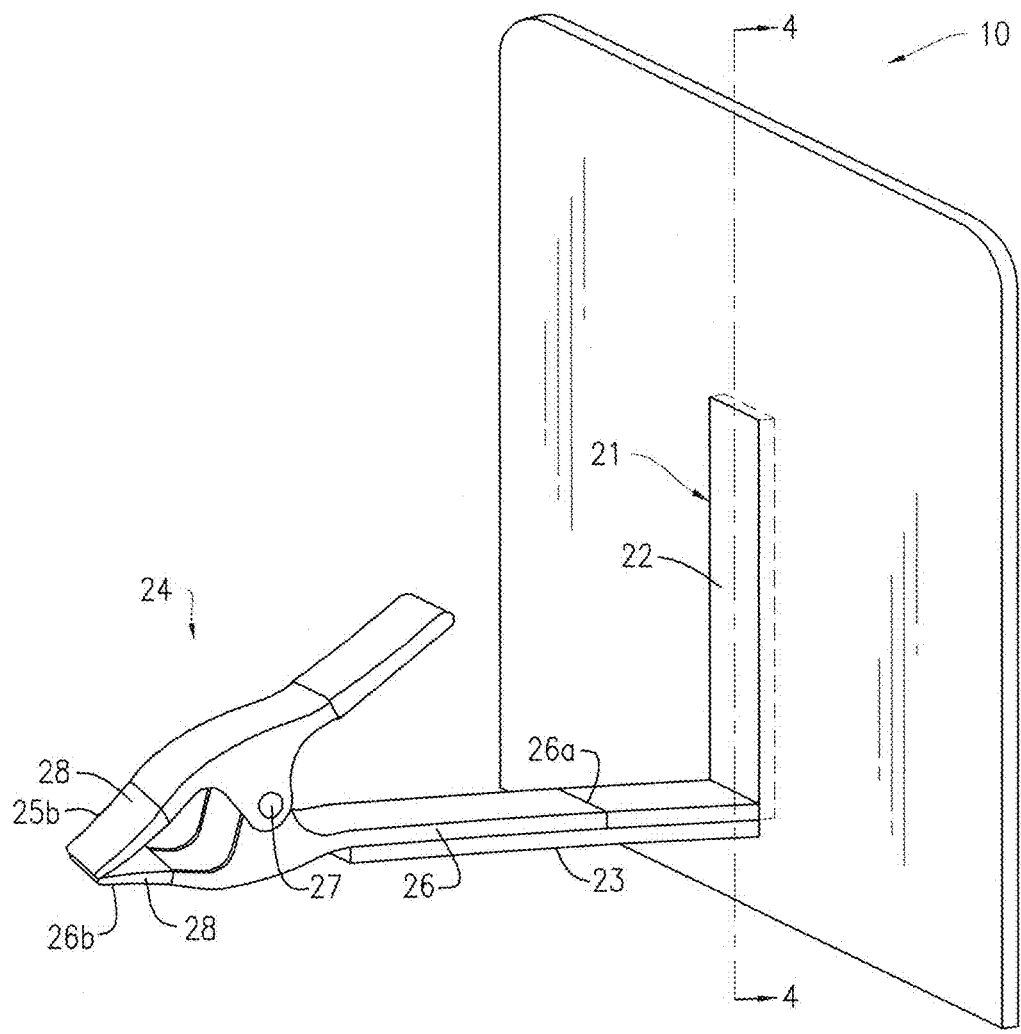
FIG. 3 is a perspective view of the automobile wind directing device having one clamp in accordance with a second alternative embodiment of the instant invention.
Figure 4:
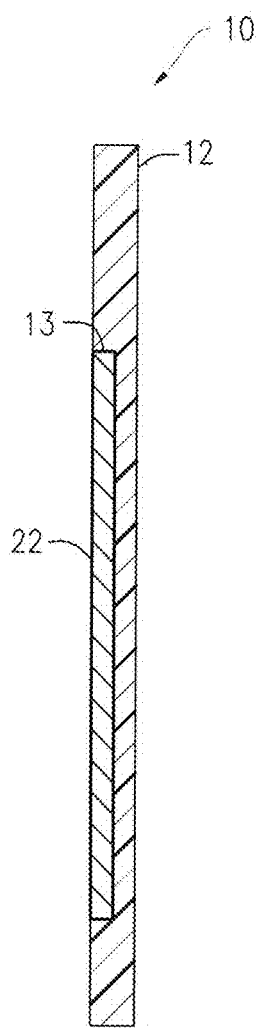
FIG. 4 is a side cross-sectional view taken along cross sectional lines 4-4 of FIG. 3 in accordance with the instant invention.

With reference to FIG. 1, the automobile wind directing device 10 includes a windshield 12, a support bracket 21 and at least one clamp 14. The windshield 12 includes a rear surface 14 and a front surface 16. The support bracket 21 includes an upper flange 22 and lower flange 23 that form substantially a right angle or L-shaped bracket but may form obtuse or acute angles. The rear surface 14 of the windshield 12 is joined with, mounted to or attached to the upper flange 22. The upper flange 22 may be mounted or attached to the top surface of the rear surface 14 of the windshield 12 with an adhesive, fastener or other hardware, as shown in FIGS. 1 and 2, or countersunk with in the rear surface 14, as shown in FIGS. 3 and 4. Wind is caught and directed by the front surface of the windshield 12 into the automobile cabin in a direction and at an angle dictated by the angle of the windshield 12 and support bracket 21. The windshield 12 may vary in size and dimensions without departing from the scope and spirit of the instant invention 10.

Still referring to FIG. 1, the clamp 24 has an upper jaw 25 and a lower jaw 26 joined together by a spring loaded pin 27. The upper jaw 25 has a handle end 25a that extends from a clamp end 25b. The handle end 25a may include a grip or sleeve 29, such as rubber or plastic, to facilitate an improved grip with a hand by providing a slip resistant surface. The lower jaw 26 has a support end 26*a* and clamp end 26*b*. The support end 26*a* extends from the clamp end 26*b* and is secured to the lower flange 23. The clamp ends 25*b* and 26*b* may each include a sleeve or tip 28, such as rubber or plastic, to facilitate an improved grip with the automobile in a manner that prevents or reduces the likelihood of movement of the automobile wind directing device 10 on the automobile during use.

In an alternative embodiment, the automobile wind directing device 10 includes a unitary clamp bracket 30 as shown in FIG. 2. The clamp bracket 30 has an upper jaw 34 and a lower jaw 32 joined together by a spring-loaded pin 37. The upper jaw 34 has a handle end 34*a* and clamp end 34*b*. The lower jaw 32 has a bracket end 32*a* and a clamp end 32*b*. The upper jaw handle end 34*a* may include a grip or sleeve 29, such as rubber or plastic, to facilitate an improved grip with a hand. The clamp ends 32*a* and 34*a* may have a sleeve or tip 38, such as rubber or plastic, to facilitate an improved grip with an automobile as above noted. The lower jaw 32 extends from the clamp end 32*b* to the bracket end 32*a* which is joined or connected to an upper bracket flange 33. The bracket end 32*a* and upper flange 33 form substantially a right angle or "L" shape, but may form an obtuse or acute angle. The upper bracket flange 33 and bracket end 32*a* may be integrally formed such that they form one machined or molded part.

With reference to FIG. 3 and FIGS. 17-19, in the preferred embodiment the automobile wind directing device 10 may have only one support bracket 21 and clamp 24 supporting the windshield 12. The support bracket 21 and clamp 24 may include the same components as described with respect to FIG. 1. The windshield 12 has a smaller width such that it only directs wind onto one person in the cabin of an automobile but may be wider than shown. The windshield 12 may have a wider width as shown in FIGS. 1 and 2 while employing only one clamp 24 and support bracket 21. The clamp ends 25*b* and 26*b* of the clamp 24 are preferably wider when only using one clamp 24 and support bracket 21 for securing the wind directing device 10. The width of the clamp ends 25*b* and 26*b* may vary and can be from two (2) to five (5) inches in some embodiments employing one support bracket 21 and clamp 24.

With reference to FIG. 4, the support bracket 21 may be countersunk into the windshield 12. The windshield rear surface 14 may include a recess 13 to accommodate a countersunk bracket 21. The upper flange 22 fits into and is secured in the recess 13 using an adhesive or hardware, such as a fastener.

Figure 5:
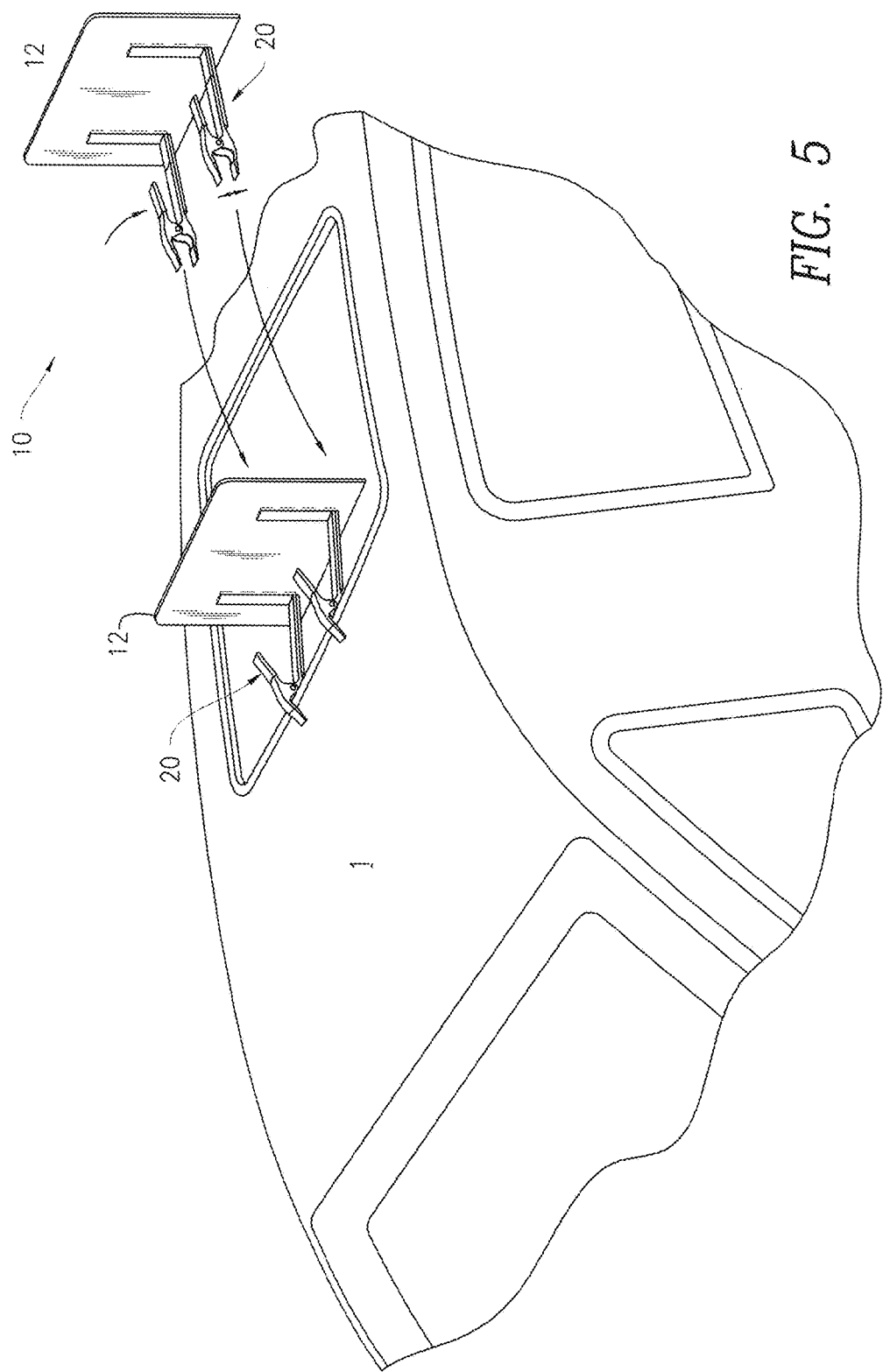
FIG. 5 is a front perspective view of the automobile wind directing device attached in a sunroof in accordance with the instant invention.
Figure 6:
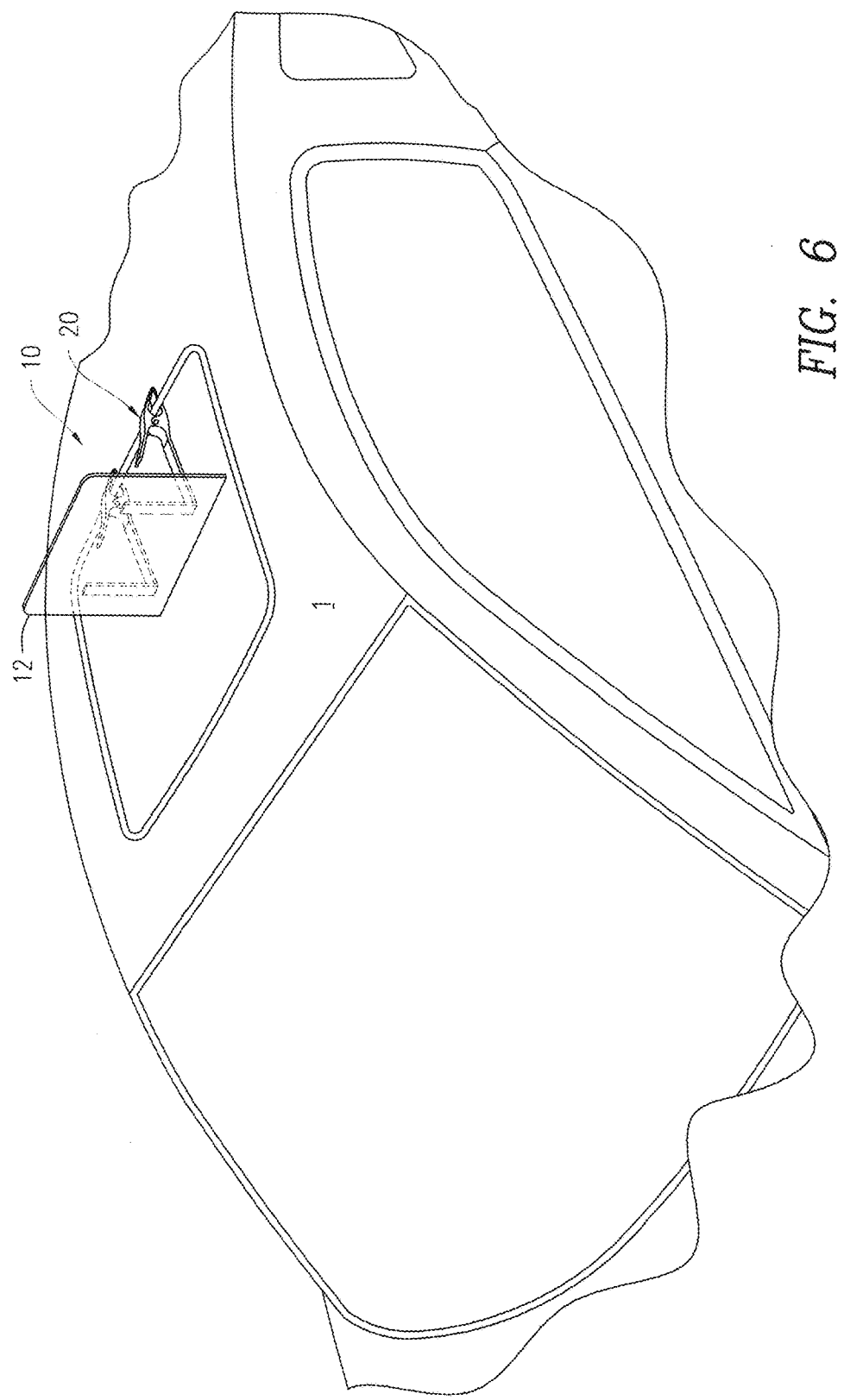
FIG. 6 is a rear perspective view of the automobile wind directing device attached in a sunroof in accordance with the preferred embodiment of the instant invention.

Referring to FIGS. 5 and 6, the automobile wind directing device 10 may be mounted to an automobile 1 at the front end or back end of a sunroof opening. The wind directing device 10 is preferably mounted at the back end of the sunroof opening. The wind directing device. 10 is mounted by squeezing the clamp 24 in the location that directs the wind into the cabin as desired. A vanity plate may be attached to the front surface 16 of the windshield 12. In this embodiment, the windshield 12 may have apertures or hardware for mating with fasteners used to secure the vanity plate to the front surface 16 of the windshield 12. The vanity plate may be used to display a team logo, name, message or other indicia. The windshield 12 may be adapted for securely mounting a portable camera for still photographs or video recordings.

With reference to FIGS. 7A-9C, the automobile wind directing device 10 includes an adjustable support bracket 21 and an adjustable clamp 24 to adjust the length, depth and, or angle at which the windshield 12 is displayed. The adjustable clamp 24 includes an upper jaw 25 pivotally connected to a lower jaw 26 by a spring 44, as shown in FIGS. 7A and 7B. The upper and lower jaws 25, 26 each have a handle end 25*a*, 26*a* and a clamp end 25*b*, 26*b*, respectively, as shown in FIGS. 7A-9C. The spring 44 has an upper prong 46 and lower prong 48. Referring to FIGS. 7A and 7B, the upper prong 46 engages or is connected to the lower surface of the upper jaw handle 25*a* and the lower prong 48 engages or is connected to the upper surface of the lower jaw 26. The upper jaw 25 has a pair of tabs 25*c* and 25*d* having apertures 25*e* and 25*f*, respectively, projecting from the upper jaw 25 below its lower surface, as shown in FIGS. 8A-8C. The lower jaw 26 has a pair of tabs 26*c* and 26*d* having apertures 26*e* and 26*f*, respectively, projecting from the lower jaw 26 above its upper surface, as shown in FIGS. 9A-9C. The upper jaw 25, lower jaw 26 and spring 44 are pivotally or rotatably joined together by a pin 27 that resides in a central channel of the spring 44 and apertures 25*e*, 25*f* and 26*e*, 26*f* of the upper and lower jaws 25, 26, respectively, as shown in FIGS. 7A and 7B. The lower jaw 26 includes a threaded aperture 26*g* for receiving a securing set screw 50 having a threaded post 52 as shown in FIG. 9C. The set screw post 52 is passed through a slotted aperture 23*a* and threaded through a threaded aperture 23*a* in the lower jaw 23 to allow sliding and securing the clamp 24 and windshield 12 in a desired position when clamping to or in a sunroof. The lower jaw 26 of the clamp 24 is slid across the support arm lower flange 23 of the support bracket 21 until the clamp 24 is in the desired position. Once in position, the set screw 50 is inserted or screwed through the support arm slotted aperture 23*e* of the support arm lower flange 23 and threaded into the threaded aperture 26*g* of the lower jaw 26, as shown in FIGS. 7B and 10.

With reference to FIGS. 7A, 7B, 11A-12C and 17-19, the adjustable support bracket 21 has an upper flange 22 and lower flange 23 pivotally connected together. The upper flange 22 has a tab 22*a* having an aperture 22*b* as shown in FIG. 12C. The lower flange 23 has a post 23*c* projecting upward from the lower flange 23, as shown in FIGS. 11A-B. The post 23*c* has an aperture 23*d* that corresponds to and aligns with the aperture 22*b* in the tab 22*a* of the upper flange 22. To assemble the wind directing device 10, the upper flange 22 is placed over the lower flange 23 so that the tab 22*a* aligns with the post 23*c* and the aperture 22*b* aligns with the lower flange post aperture 23*d* which allows the insertion of an axle 43 to form a pivot point, as shown in FIGS. 7A-B. The angle of the upper flange 22 with respect to the lower flange 23 may be fixed with a fastener, such as an allen key, screw or other known fastener. The upper flange 22 and lower flange 23 may include corresponding ridges, tabs and, or slots placed at different angles for setting the angle of the upper flange 22 by causing the engagement of the corresponding ridges, tabs and, or slots. Referring to FIGS. 12A-B, the upper flange 22 has a width that supports the windshield 12 when the upper flange 22 of the support bracket 21 is connected to the rear surface 14 of the windshield 12 and the lower flange 23 is pivotally connected to the upper flange 22 and clamp 24.

Figure 13:
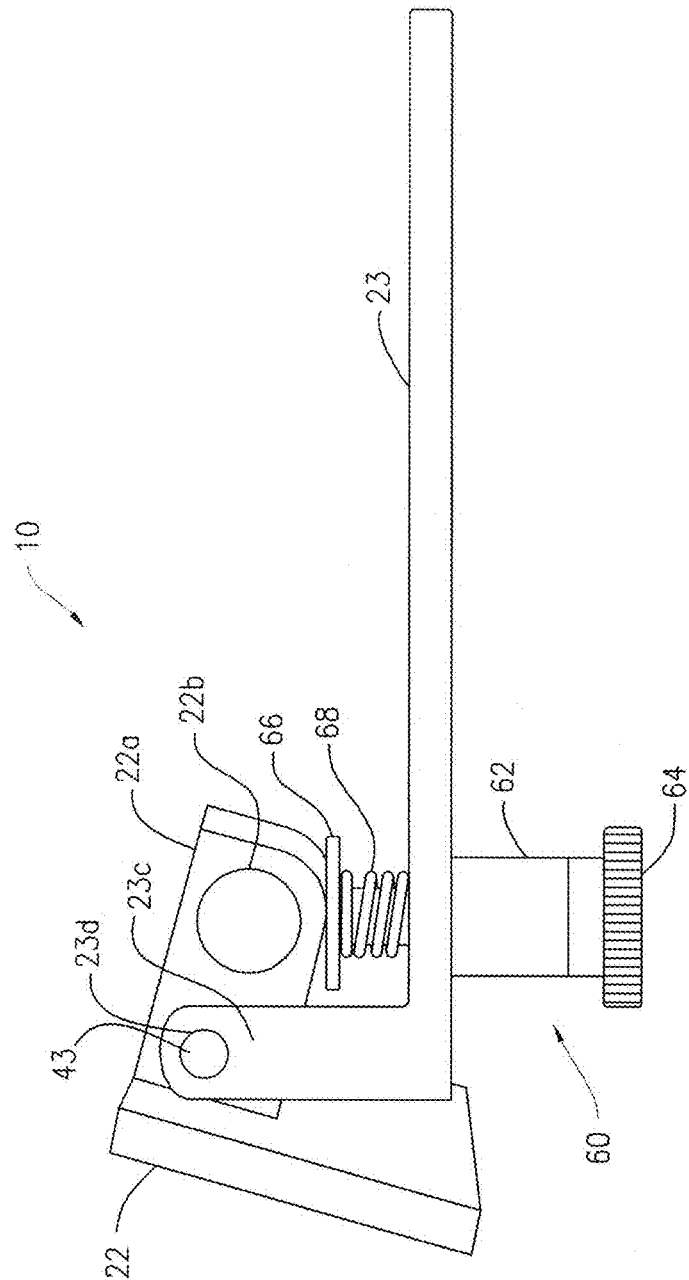
FIG. 13 is a side elevational view of the support bracket of the automobile wind directing device and clamping system in accordance with another embodiment of the instant invention.
Figure 14:
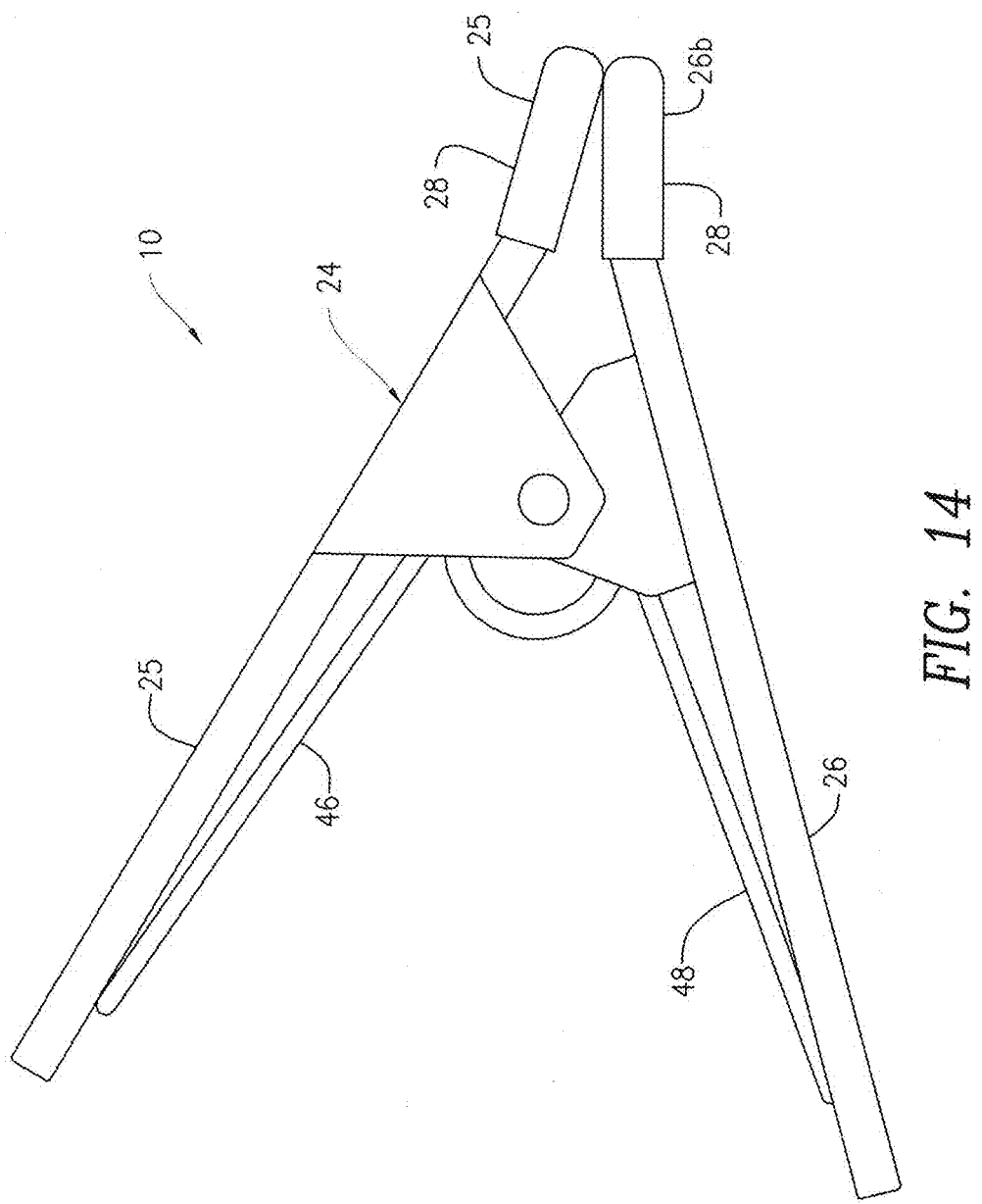
FIG. 14 is a side elevational view of the clamp of the automobile wind directing device and clamping system in accordance with the instant invention.
Figure 15:
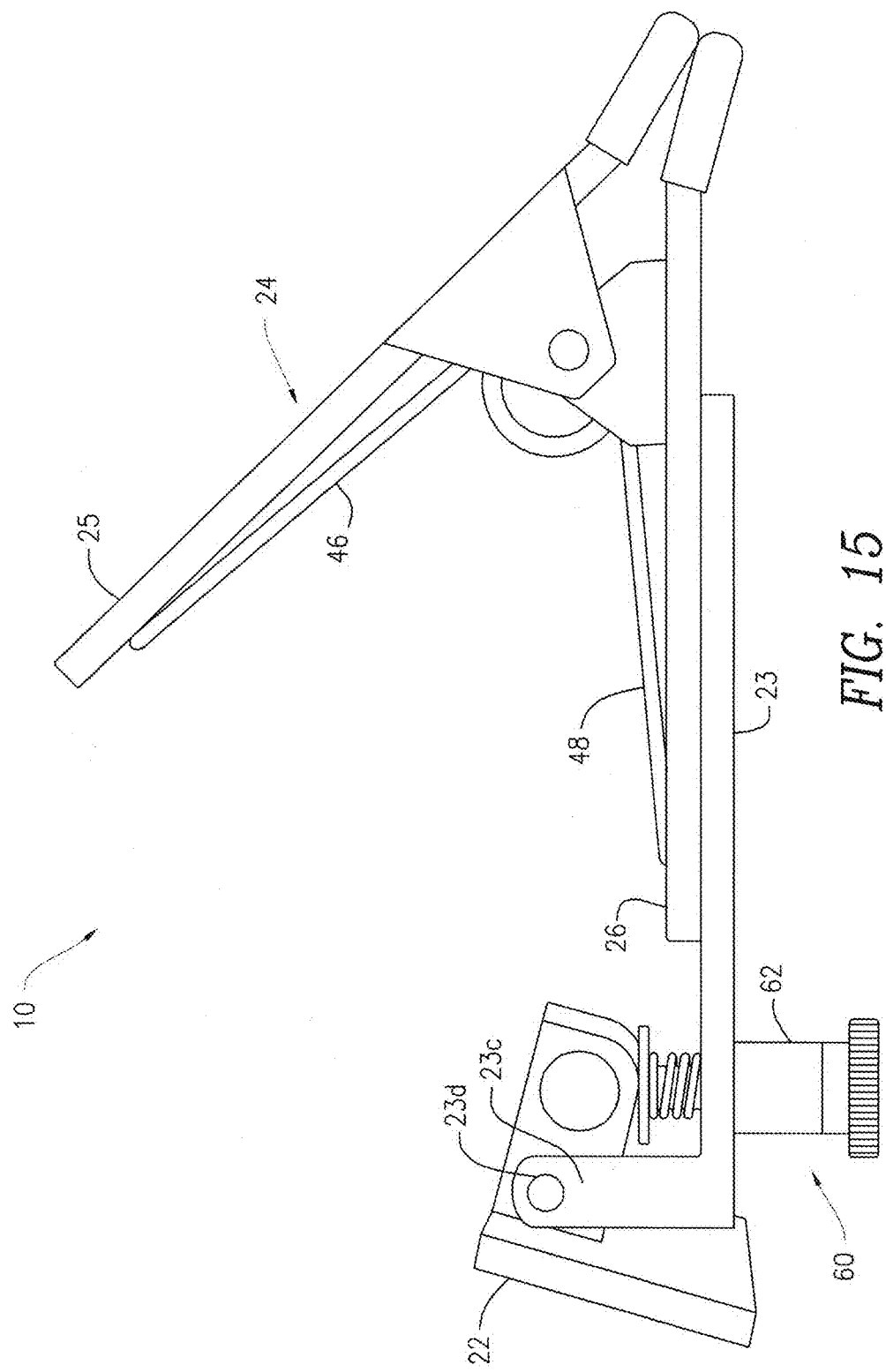
FIG. 15 is a side elevational view of the automobile wind directing device and clamping system without the windshield in accordance with the instant invention.

With reference to FIGS. 13-15, the wind directing device 10 may include a support bracket 21 wherein the angle of the upper flange 22 with respect to the lower flange 23 is set by an adjustment bolt or screw assembly 60 in another embodiment. The angle adjustment assembly 60 includes a fastener post 62 that passes through an aperture in the lower flange 23 and a plate 66 at the end of the post 62 that is wider than the aperture and engages the upper flange tab 22*a*. The angle adjustment assembly 60 may also have a tension spring 68 for affording slight deflection of the upper flange 22, and hence windshield 12, while providing stability to prevent the windshield from breaking under strong wind forces that can occur if the upper flange 22 is too rigid. Referring to FIGS. 14 and 15, the clamp 24 is attached to the lower flange 23 as shown in and discussed with reference to FIGS. 7A-12C and 17-19.

Figure 16:
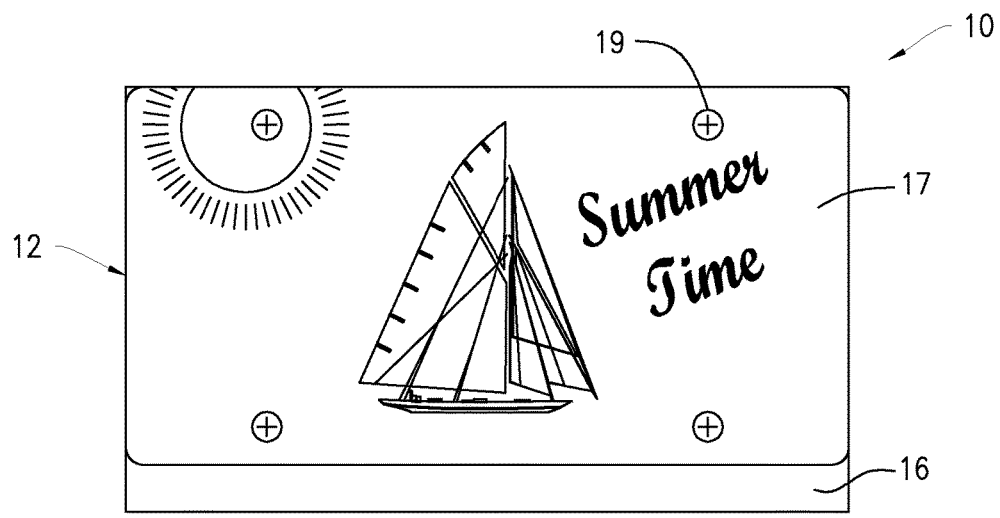
FIG. 16 is a front perspective view of the automobile wind directing device showing a vanity plate attached to the front surface of the wind directing device in accordance with the instant invention.
Figure 17:
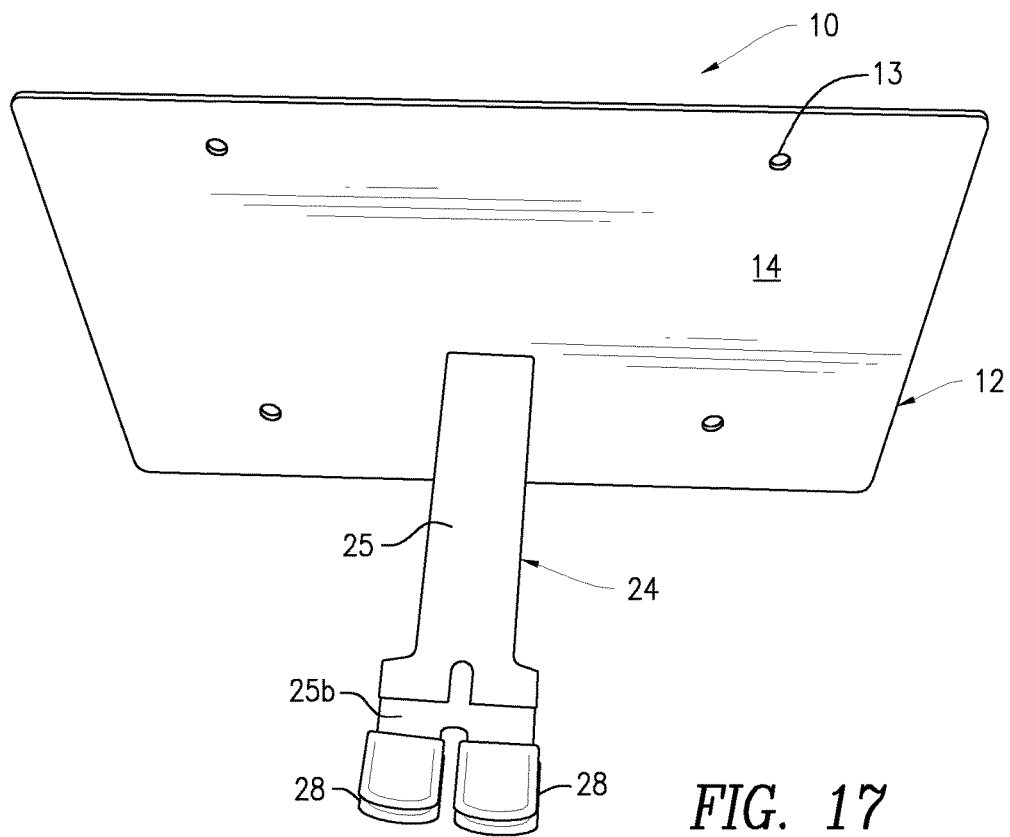
FIG. 17 is a rear perspective view of the automobile wind directing device showing threaded or unthreaded fastener apertures used for connecting a vanity plate to the wind directing device and a clamp with a clamping end having two prongs or bifurcated in accordance with the instant invention.
Figure 18:
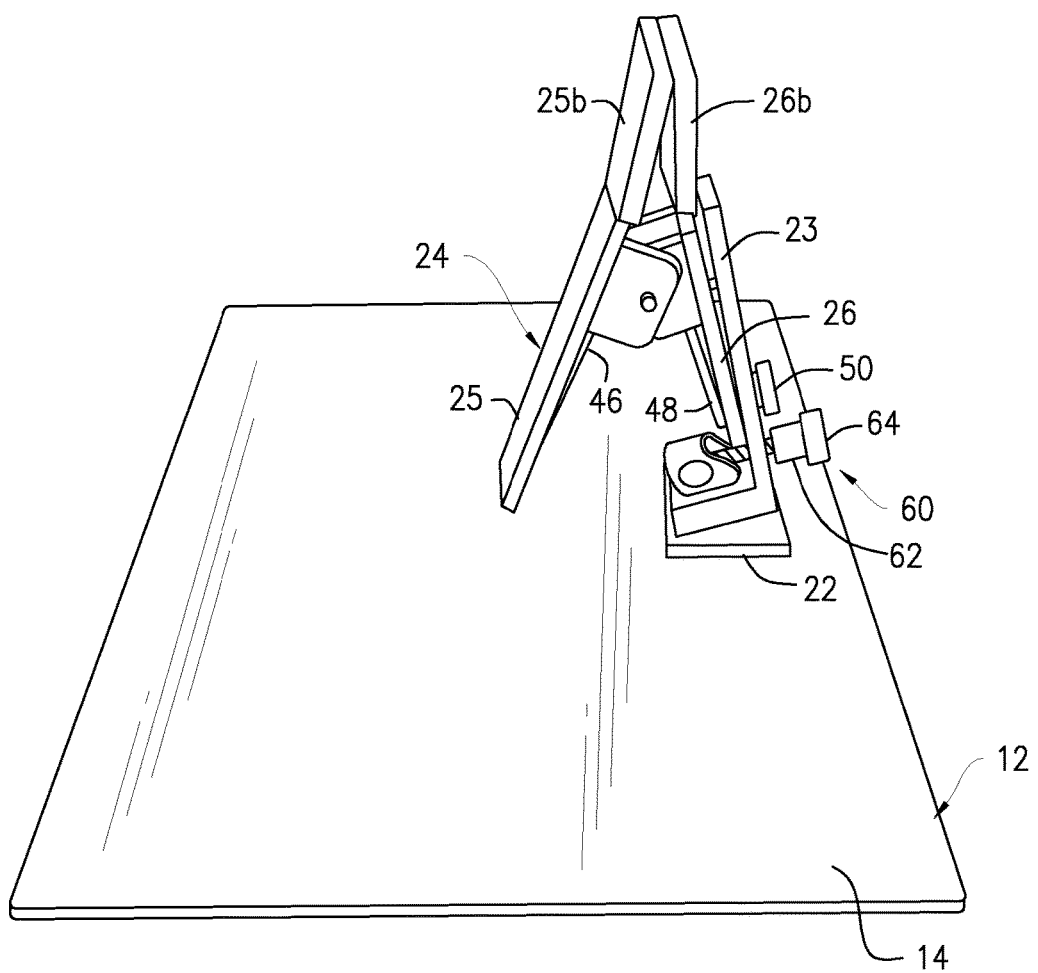
FIG. 18 is a side perspective view of the automobile wind directing device in accordance with the preferred embodiment of the instant invention.
Figure 19:
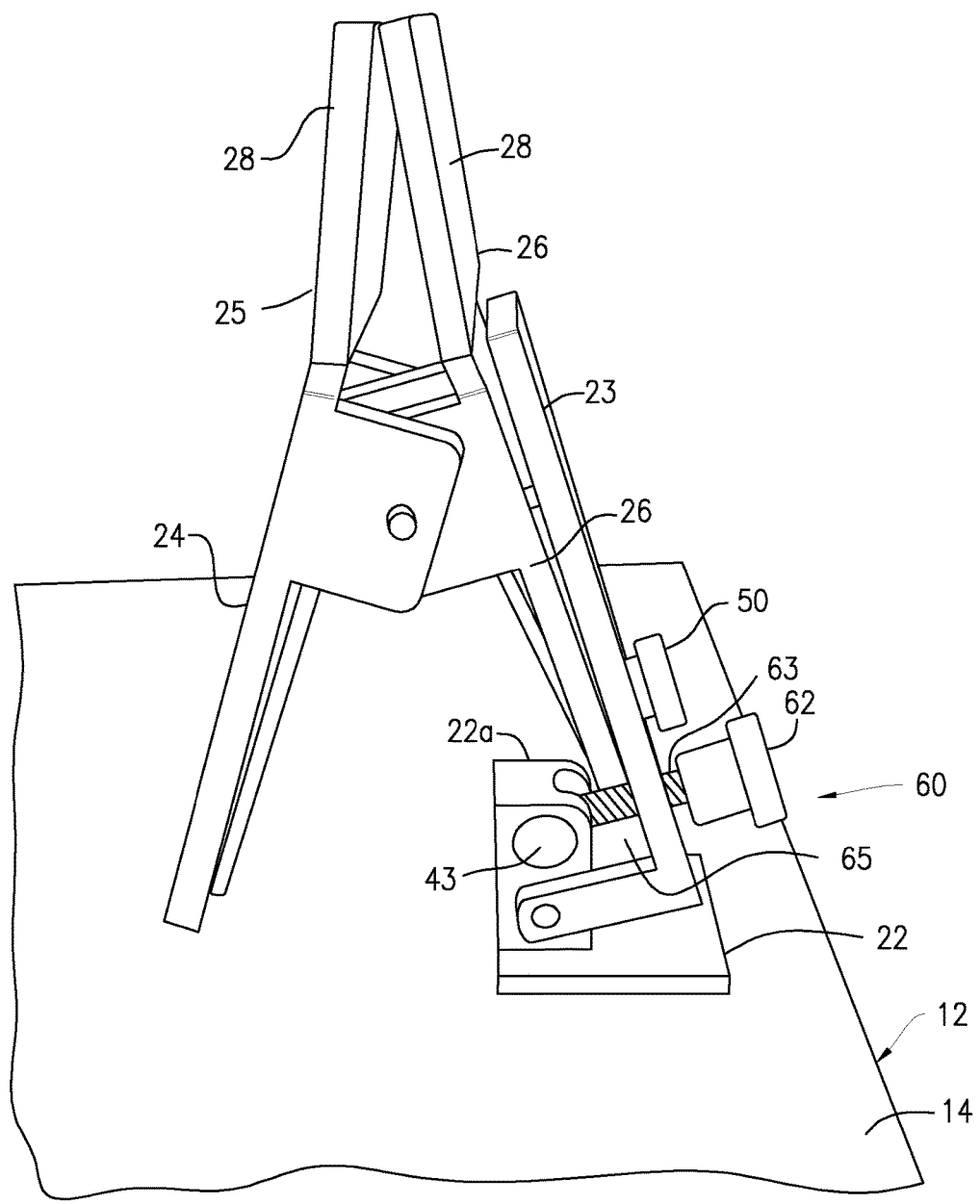
FIG. 19 is a side perspective view of the automobile wind directing device showing the support arm rotatably connected to the support bracket and the clamp slidably connected to the support arm in accordance with the preferred embodiment of the instant invention.

With reference to FIGS. 16-17, the automobile wind directing device 10 may include an attachable and removable plate 17, such as a license plate that displays a team or business name or logo or some other desired message. The windshield 12 may include a plurality of threaded or non-threaded apertures 13 for receiving fasteners 19 used in securing the plate 17 to the windshield, as shown in FIGS. 16 and 17. Referring to FIG. 17, the upper and lower jaws 25, 26 of the clamp 24 may have bifurcated clamp ends 25*b*, 26*b* which have rubber or plastic tip covers or coatings 28 to avoid scratching the vehicle when mounted in a sunroof opening.

Referring to FIGS. 7A-19, the preferred embodiment of the automobile wind directing device 10 includes the support flange 22 having a support post or tab 22*a* projecting from the flange base and a support arm 23 rotatably connected to the support post 22*a* by an axle or pin. A threaded post 50 intersects the slot 23*e* in the support arm 23 and is secured to the lower jaw 26 of the clamp 24. The post 50 is loosened to slide the clamp 24 along the support arm 23 and set the depth position of the wind directing device 10 in a sunroof opening when the threaded post 50 is tightened. The angle adjustment assembly 60 has the knob post 62, 64 and threaded post 63 that is threadably connected to the support arm 23 and engages the support post 22*a* for adjusting and fixing the angle of the support arm 23 and hence windshield 12 when rotated clockwise or counterclockwise, as described further herein. The amount of angular adjustment of the support arm 23 is limited by fixed plate or bolt 65 affixed to the threaded post 63.

Figure 20:
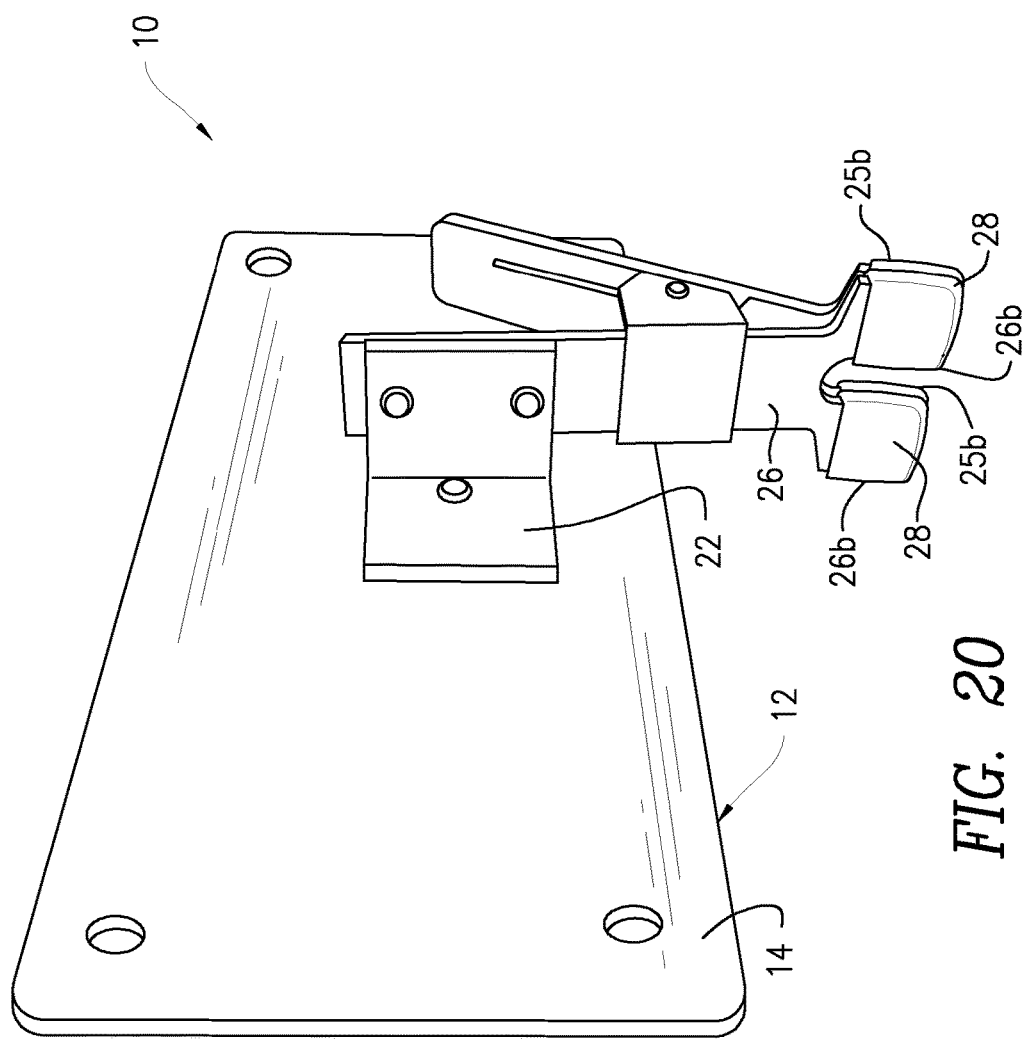
FIG. 20 is a side perspective view of the automobile wind directing device adapted for attaching to a vehicle in a door window showing the clamp connected directly to the support bracket in accordance with the instant invention.

With reference to FIG. 20, the wind deflecting device 10 may be adapted for attaching to a vehicle inside or adjacent a door window opening. This embodiment of the instant invention 10 includes a windshield 12, a support bracket 22 connected or attached to the rear surface 14 of the windshield 12 and a clamp 24 attached to the support bracket 22. The lower jaw 26 of the clamp 24 is affixed to the support bracket 22. The upper jaw 24 is squeezed toward the lower jaw 26 to open the clamp 24 over a selected portion of the vehicle proximal the window opening and released when in position to secure the wind deflecting device 10 to the vehicle. Plastic or rubber tips 28 may be mounted or attached to the upper jaw 24 or lower jaw 26 handle ends or clamping ends 25*b*, 26*b*, as shown.

Figure 21:
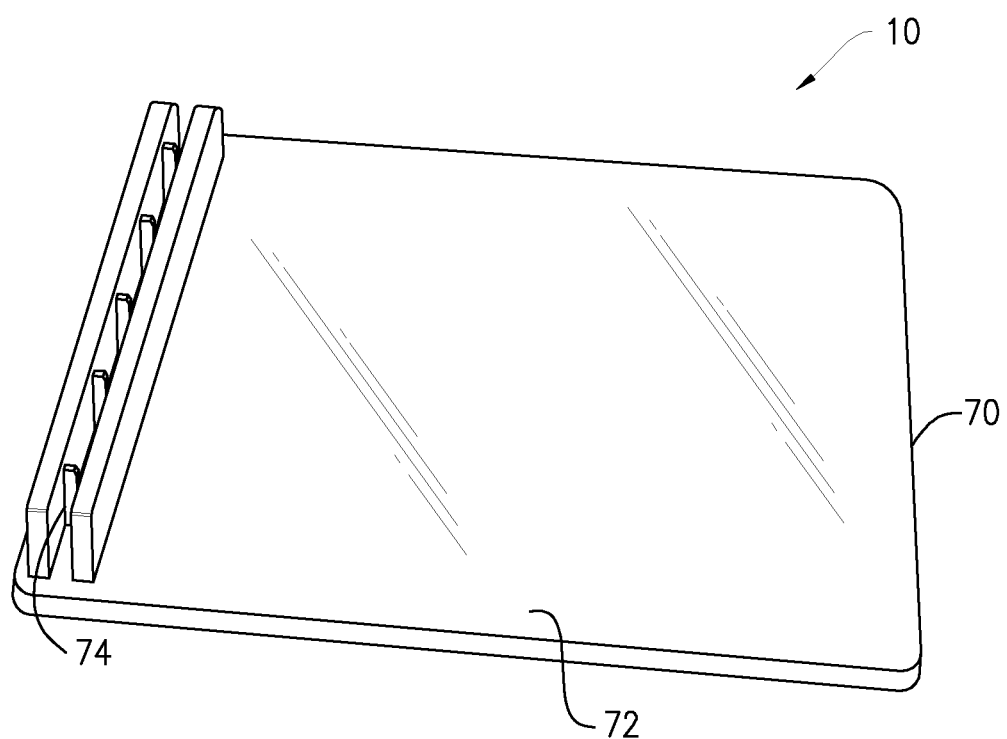
FIG. 21 is a perspective view of the wedge of the automobile wind directing device in accordance with the instant invention.

With reference to FIG. 21, the wind deflecting device 10 may also include a wedge 70 having a flat surface 72 with a flange end 74 formed by one or two projecting walls wherein a gap may be formed between two walls. The wedge 70 is used on vehicles having a sunroof with a guide bar. The flat surface 72 is wedged into the roof slot where the sun roof slides to help secure the wind deflecting device 10 in a desired position.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An automobile wind directing device adapted for attachment to a vehicle over or inside a sunroof or window of a motor vehicle, said wind directing device comprising:
   a windshield plate having a front surface and a rear surface;
   a support bracket projecting from said rear surface of said windshield plate;
   a support flange mounted to said support bracket, said support flange having a first leg rotatably connected to said support bracket, a second leg and a clamp mounting means for slidably mounting said clamp to said second leg; and
   a clamp having a first jaw and a second jaw connected together by a spring, said second jaw being mounted to said support flange wherein said first jaw and said second jaw grip to the vehicle such that said windshield directs wind into the vehicle.

2. A wind directing device as recited in claim 1, wherein said clamp mounting means comprises:
   a slot defined in said second leg;
   a threaded fastener rotatably mounted to said second jaw, wherein said threaded fastener secures said clamp against said support arm when tightened.

3. A wind directing device as recited in claim 1, further comprising:
   a threaded bolt threadably mounted to and through said second leg of said support flange, said threaded bolt having a free end that engages said support bracket for adjusting and fixing the angle of said support arm.

4. A wind directing device as recited in claim 3, further comprising:
   an angle limit means for limiting the angular adjustment of said support flange.

5. A wind directing device as recited in claim 3, wherein said support bracket comprises:
   a base disposed on said rear surface of said windshield plate;
   a post projecting outward from said base, said first leg of said support flange being rotatably mounted to said post.

6. A wind directing device as recited in claim 1, further comprising:
   a plurality of apertures in said windshield plate.

7. A wind directing device as recited in claim 6, further comprising:
   a sign plate mountable to said front surface of said windshield plate;
   a plurality of fasteners for securing said sign plate to said windshield plate.

8. A wind directing device as recited in claim 1, wherein said support bracket comprises:
   a base disposed on said rear surface of said windshield plate;
   a post projecting outward from said base, said first leg of said support flange being rotatably mounted to said post.

9. A wind directing device as recited in claim 1, further comprising:
   soft tips defined on said first jaw and said second jaw.

10. A wind directing device as recited in claim 1, further comprising:

a wedge insertable in the sunroof opening of the vehicle so as to keep a wind deflector in the sunroof opening from elevating.

11. An automobile wind directing device adapted for attachment to a vehicle over or inside a sunroof or window of a motor vehicle, said wind directing device comprising:
   a windshield plate having a front surface and a rear surface;
   a plurality of apertures in said windshield plate;
   a support bracket projecting from said rear surface of said windshield plate;
   a support flange mounted to said support bracket;
   a first leg rotatably connected to said support bracket;
   a second leg;
   a clamp having a first jaw and a second jaw connected together by a spring, said second jaw being mounted to said support flange wherein said first jaw and said second jaw grip to the vehicle such that said windshield directs wind into the vehicle, and
   a clamp mounting means for slidably mounting said clamp to said second leg.

12. A wind directing device as recited in claim 11, wherein said clamp mounting means comprises:
   a slot defined in said second leg;
   a threaded fastener rotatably mounted to said second jaw, wherein said threaded fastener secures said clamp against said support arm when tightened.

13. A wind directing device as recited in claim 11, further comprising:
   a threaded bolt threadably mounted to and through said second leg of said support arm, said threaded bolt having a free end that engages said support bracket for adjusting and fixing the angle of said support arm.

14. A wind directing device as recited in claim 13, further comprising:
   an angle limit means for limiting the angular adjustment of said support flange.

15. A wind directing device as recited in claim 13, wherein said support bracket comprises:
   a base disposed on said rear surface of said windshield plate;
   a post projecting outward from said base, said first leg of said support flange] being rotatably mounted to said post.

16. A wind directing device as recited in claim 11, wherein said support bracket comprises:
   a base disposed on said rear surface of said windshield plate;
   a post projecting outward from said base, said first leg of said support flange being rotatably mounted to said post.

17. A wind directing device as recited in claim 11, further comprising:
   soft tips defined on said first jaw and said second jaw.

* * * * *